(12) United States Patent
Loh et al.

(10) Patent No.: US 8,949,544 B2
(45) Date of Patent: Feb. 3, 2015

(54) BYPASSING A CACHE WHEN HANDLING MEMORY REQUESTS

(71) Applicant: Advanced Micro Devices, Sunnyvale, CA (US)

(72) Inventors: Gabriel H. Loh, Bellevue, WA (US); Jaewoong Sim, Atlanta, GA (US); James M. O'Connor, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 221 days.

(21) Appl. No.: 13/714,559

(22) Filed: Dec. 14, 2012

(65) Prior Publication Data

US 2014/0143493 A1 May 22, 2014

Related U.S. Application Data

(60) Provisional application No. 61/728,110, filed on Nov. 19, 2012.

(51) Int. Cl.
*G06F 12/00* (2006.01)
*G06F 12/08* (2006.01)

(52) U.S. Cl.
CPC ........ *G06F 12/0802* (2013.01); *G06F 12/0804* (2013.01); *G06F 12/0862* (2013.01)
USPC ........................................................ 711/138

(58) Field of Classification Search
None
See application file for complete search history.

(56) References Cited

U.S. PATENT DOCUMENTS

| 7,895,397 | B2 * | 2/2011 | Tetrick | 711/118 |
| 8,285,924 | B1 * | 10/2012 | Cohn et al. | 711/113 |
| 2009/0070527 | A1 * | 3/2009 | Tetrick | 711/113 |

* cited by examiner

*Primary Examiner* — Brian Peugh
(74) *Attorney, Agent, or Firm* — Park, Vaughan, Fleming & Dowler, LLP (57) ABSTRACT

The described embodiments include a computing device that handles memory requests. In some embodiments, when a memory request is to be sent to a cache in the computing device or to be bypassed to a next lower level of a memory hierarchy in the computing device based on expected memory request resolution times, a bypass mechanism is configured to send the memory request to the cache or bypass the memory request to the next lower level of the memory hierarchy.

20 Claims, 4 Drawing Sheets

BYPASSING A CACHE WHEN HANDLING MEMORY REQUESTS

RELATED APPLICATION

The instant application is a non-provisional application from, and hereby claims priority under 35 U.S.C. §119 to, U.S. provisional patent application No. 61/728,110, which is titled "A Mostly-Clean DRAM Cache for Effective Hit Speculation and Self-Balancing Dispatch," by Jaewoong Sim, Gabriel H. Loh, Hyesoon Kim, James M. O'Connor, and Mithuna Thottehodi, which was filed on 19 Nov. 2012, and which is herein incorporated by reference.

The instant application is related to pending U.S. patent application Ser. No. 13/709,044, which is titled "Bypassing Memory Requests to a Main Memory," by inventors Jaewoong Sim and Gabriel H. Loh, which was filed on 9 Dec. 2012, and which is herein incorporated by reference.

BACKGROUND

1. Field

The described embodiments relate to caches in electronic devices. More specifically, the described embodiments relate to a technique for bypassing a cache when handling memory requests.

2. Related Art

Many modern computing devices (e.g., laptop/desktop computers, smart phones, set-top boxes, appliances, etc.) include a processing subsystem with one or more caches. Caches are generally smaller, fast-access memory circuits located in or near the processing subsystem that can be used to store data that is retrieved from lower levels of a memory hierarchy in the computing device (i.e., other, larger caches and/or memories) to enable faster access to the stored data.

During operation of such computing devices, memory requests are sent to a cache in an attempt to quickly resolve the memory requests. When attempts to resolve memory requests in the cache fail, the memory requests are forwarded to lower levels of the memory hierarchy to be resolved. In some cases, attempting memory requests in the cache in this way can result in unnecessary delay in the resolution of memory requests and/or can inefficiently use system resources in the computing device.

SUMMARY

The described embodiments include a computing device that handles memory requests. In some embodiments, when a memory request is to be sent to a cache in the computing device or to be bypassed to a next lower level of a memory hierarchy (than the cache) in the computing device based on expected memory request resolution times, a bypass mechanism is configured to send the memory request to the cache or bypass the memory request to the next lower level of the memory hierarchy.

In some embodiments, the bypass mechanism is configured to determine that the memory request is to be sent to the cache or is to be bypassed to the next lower level of the memory hierarchy based on expected memory request resolution times by computing a first expected resolution time based on a first expected latency of memory requests to the cache and a first number of memory requests to be sent to the cache and computing a second expected resolution time based on a second expected latency of memory requests to the next lower level of the memory hierarchy and a second number of memory requests to be sent to the next lower level of the memory hierarchy. The bypass mechanism is further configured to determine that the memory request is to be sent to the cache when the first expected resolution time is lower then the second expected resolution time and determine that the memory request is to be bypassed to the next lower level of the memory hierarchy when the second expected resolution time is lower then the first expected resolution time.

In some embodiments, the first expected latency of memory requests to the cache and the second expected latency of memory requests to the next lower level of the memory hierarchy are one of: (1) average latencies, or (2) minimum latencies.

In some embodiments, the bypass mechanism is configured to adjust one or more of the first expected latency and the second expected latency based on at least one configuration of circuits.

In some embodiments, the cache is configured to copy at least a portion of data written to the cache to the next lower level of the memory hierarchy to ensure that the memory request bypassed to the next lower level of the memory hierarchy results in a same data being returned as would have been returned if the memory request was sent to the cache.

In some embodiments, prior to determining if the memory request is to be sent to the cache or to be bypassed to the next lower level of the memory hierarchy, the bypass mechanism is configured to determine that the memory request is from a predetermined class of memory requests. The bypass mechanism then bypasses the memory request to the next lower level of the memory hierarchy.

In some embodiments, the computing device is configured to maintain one or more records of dirty data in the cache. In these embodiments, prior to determining if the memory request is to be sent to the cache or to be bypassed to the next lower level of the memory hierarchy, the bypass mechanism is configured to determine, based on the one or more records, that the memory request is likely directed to dirty data in the cache. The bypass mechanism then sends the memory request that is likely directed to dirty data to the cache (i.e., does not bypass the memory request).

In some embodiments, when sending the memory request that is likely directed to dirty data to the cache, the bypass mechanism is configured to place the memory request in a queue of memory requests to be sent to the cache. In some of these embodiments, before placing the memory request in the queue, the bypass mechanism is configured to determine at least one memory request that was previously placed in the queue to be removed from the queue and bypassed to the next lower level of the memory hierarchy.

In some embodiments, the memory request is to access a cache block. In these embodiments, when maintaining the one or more records of dirty data in the cache, the computing device is configured to maintain at least one record for a region of the cache that includes a plurality of cache blocks, wherein the at least one record indicates that all cache blocks in the region contain dirty data when any one of the cache blocks in the region contains dirty data.

In some embodiments, when maintaining one or more records of dirty data in the cache, the computing device is configured to maintain a directory with a listing of dirty data in the cache.

In some embodiments, after bypassing the memory request to the next lower level of the memory hierarchy, the cache is configured to receive data in response to the bypassed memory request from the next lower level of the memory hierarchy. The cache then determines, based on a predetermined policy, that the data received in response to the bypassed memory request should be stored in the cache and stores the data in the cache.

In some embodiments, after bypassing the memory request to the next lower level of the memory hierarchy, the cache is configured to receive data in response to the bypassed memory request from the next lower level of the memory hierarchy. The cache then updates metadata in the cache to indicate that a corresponding location in the cache was accessed.

In some embodiments, bypassing the memory request to the next lower level of the memory hierarchy comprises sending the memory request to the next lower level of the memory hierarchy without first attempting the memory request in the cache.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., computing device 100 in FIG. 1) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, graphics processors (GPUs)/graphics processor cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In the following description, functional blocks may be referred to in describing some embodiments. Generally, functional blocks include one or more circuits (and, typically, multiple interrelated circuits) that perform the described operations. In some embodiments, the circuits in a functional block include complex circuits that execute program code (e.g., machine code, firmware, etc.) to perform the described operations.

Overview

The described embodiments include a bypass mechanism associated with a cache. Upon receiving a memory request, the bypass mechanism determines if an attempt should be made to satisfy the memory request in the cache, or if the memory request should be bypassed to a next lower level of a memory hierarchy by sending the memory request from the cache to the next lower level of the memory hierarchy without first attempting to satisfy the memory request in the cache. In some embodiments, when making the determination if the memory request should be bypassed, the bypass mechanism determines an expected resolution time for the memory request the cache ($C_{ERT}$) and an expected resolution time for the memory request in the next lower level of the memory hierarchy ($LL_{ERT}$). The bypass mechanism then determines that the memory request should be bypassed when $C_{ERT}$ has a predetermined relationship to $LL_{ERT}$ (e.g., is higher, is within a predetermined value of, etc.). In some embodiments, the bypass mechanism makes the determination based on one or more additional conditions.

Generally, in embodiments where cache blocks in the cache can be modified without the same modification immediately being made to the data in the next lower level of the memory hierarchy (i.e., when cache blocks in the cache contain "dirty" data), bypassing memory requests as described could lead to errors. These errors would occur because memory requests that are bypassed to the next lower level in the memory hierarchy may retrieve stale data in these embodiments. However, the described embodiments include mechanisms for handling dirty data so that bypassing memory requests does not lead to the access of stale data.

In addition, when data is returned from a bypassed memory request, the data may (or may not) already be stored in the cache. The described embodiments include mechanisms for handling data returned in response to a bypassed memory request. In some embodiments, these mechanisms also handle metadata for cache blocks to maintain relevant information when memory requests are bypassed.

The described embodiments use bypassing to satisfy memory requests as fast or faster than accessing the cache to satisfy the memory requests, and/or to more efficiently use system bandwidth. In this way, the described embodiments can more efficiently access data in a memory hierarchy than existing computing devices.

Computing Device

Figure 1:
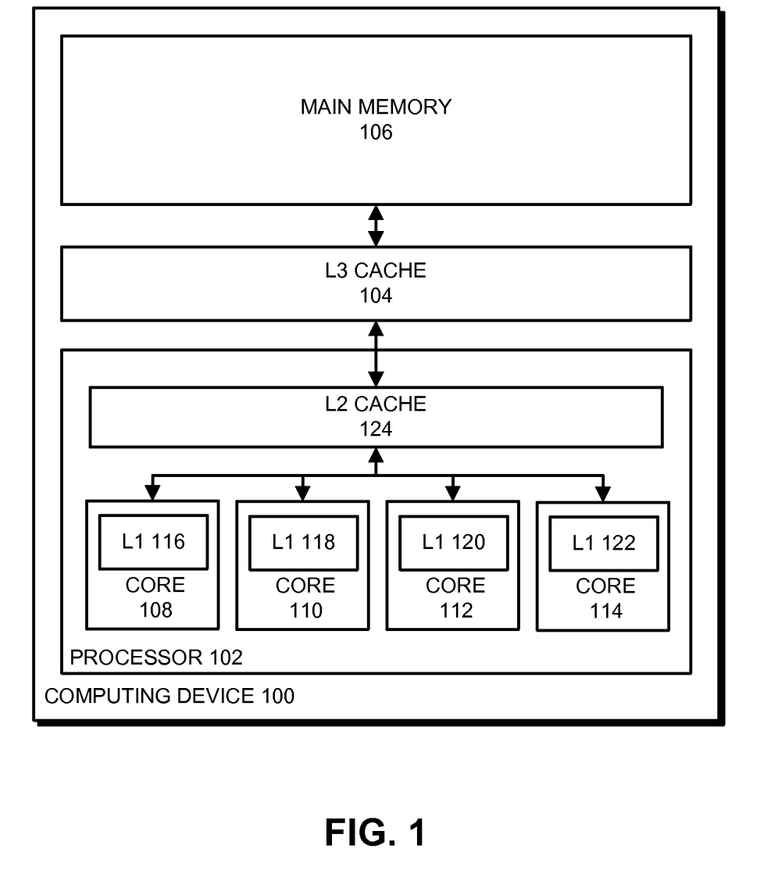
FIG. 1 presents a block diagram illustrating a computing device in accordance with some embodiments.

FIG. 1 presents a block diagram illustrating a computing device 100 in accordance with some embodiments. As can be seen in FIG. 1, computing device 100 includes processor 102, L3 cache 104, and main memory 106. Processor 102 is generally a device that performs computational operations in computing device 100. Processor 102 includes four processor cores 108-114, each of which includes a computational mechanism such as a central processing unit (CPU), a graphics processing unit (GPU), and/or an embedded processor.

Processor 102 also includes cache memories (or "caches") used for storing instructions and data that are used by processor cores 108-114 for performing computational operations. As can be seen in FIG. 1, the caches in processor 102 include a level-one (L1) cache 116-122 (e.g., "L1 116") in each processor core 108-114 that is used for storing instructions and data for use by the processor core. Generally, L1 caches 116-122 are the smallest of a set of caches in computing device 100 (e.g., 96 kilobytes (KB) in size) and are located closest to the circuits (e.g., execution units, instruction fetch units, etc.) in the processor cores 108-114 that use the instructions and data that are stored in the L1 caches 116-122. The closeness of the L1 caches 116-122 to the corresponding circuits enables the fastest access to the instructions and data stored in the L1 caches 116-122 from among the caches in computing device 100.

Processor 102 also includes a level-two (L2) cache 124 that is shared by processor cores 108-114 and hence is used for storing instructions and data for all of the sharing processor cores 108-114. Generally, L2 cache 124 is larger than the L1 caches 116-122 (e.g., 2048 KB in size) and is located outside, but close to, processor cores 108-114 on the same semiconductor die as the processor cores 108-114. Because L2 cache 124 is located outside the processor cores 108-114 but on the same die, access to the instructions and data stored in L2 cache 124 is slower than accesses to the L1 caches, but faster than accesses to L3 cache 104 in computing device 100.

Returning to computing device 100, the largest of the caches in computing device 100 (at e.g., 16 MB in size), level-three (L3) cache 104 is shared by the processor cores 108-114 and hence is used for storing instructions and data for all of the processor cores. In some embodiments, L3 cache 104 is located external to processor 102 (e.g., on a different die or dies than processor 102). Accordingly, accessing data and instructions in L3 cache 104 is typically slower than accessing data and instructions in the higher-level caches.

In some embodiments, each of L1 caches 116-122, L2 cache 124, and L3 cache 104 (collectively, "the caches") include memory circuits that are used for storing cached data and instructions. For example, the caches may include one or more of static random access memory (SRAM), embedded dynamic random access memory (eDRAM), DRAM, double data rate synchronous DRAM (DDR SDRAM), and/or other types of memory circuits.

Main memory 106 comprises memory circuits that form a "main memory" of computing device 100. Main memory 106 is used for storing instructions and data for use by the processor cores 108-114 on processor 102. In some embodiments, main memory 106 is fabricated from memory circuits such as one or more of DRAM, SRAM, DDR SDRAM, and/or other types of memory circuits.

Taken together, L1 caches 116-122, L2 cache 124, L3 cache 104, and main memory 106 form a "memory hierarchy" in and for computing device 100. Each of the caches and main memory 106 are regarded as levels of the memory hierarchy, with the lower levels including the larger caches and main memory 106. Within computing device 100, memory requests are preferentially handled in the level of the memory hierarchy that results in the fastest and/or most efficient operation of computing device 100.

Although embodiments are described with a particular arrangement of processor cores, some embodiments include a different number and/or arrangement of processor cores. For example, some embodiments have only one processor core (in which case the caches are used by the single processor core), while other embodiments have two, five, eight, or another number of processor cores—with the memory hierarchy adjusted accordingly. Generally, the described embodiments can use any arrangement of processor cores that can perform the operations herein described.

Additionally, although embodiments are described with a particular arrangement of caches, some embodiments include a different number and/or arrangement of caches. For example, in some embodiments, some or all of the caches (e.g., L1 caches 116-122, etc.) are divided into separate instruction and data caches. Additionally, L2 cache 124 and/or L3 cache 104 may not be shared in the same way as shown, and hence may only be used by a single processor core, two processor cores, etc. (and hence there may be multiple L2 caches 124 and/or L3 caches 104 in processor 102). As another example, some embodiments include different levels of caches, from only one level of cache to multiple levels of caches, and these caches can be located in processor 102 and/or external to processor 102. For example, in some embodiments, L3 cache 104 is located on the same die as processor 102. Generally, the described embodiments can use any arrangement of caches that can perform the operations herein described.

Moreover, although computing device 100 and processor 102 are simplified for illustrative purposes, in some embodiments, computing device 100 and/or processor 102 include additional mechanisms for performing the operations herein described and other operations. For example, computing device 100 and/or processor 102 can include power controllers, mass-storage devices such as disk drives or large semiconductor memories (as part of the memory hierarchy), batteries, media processors, input-output mechanisms, communication mechanisms, networking mechanisms, display mechanisms, etc.

Cache

Figure 2:
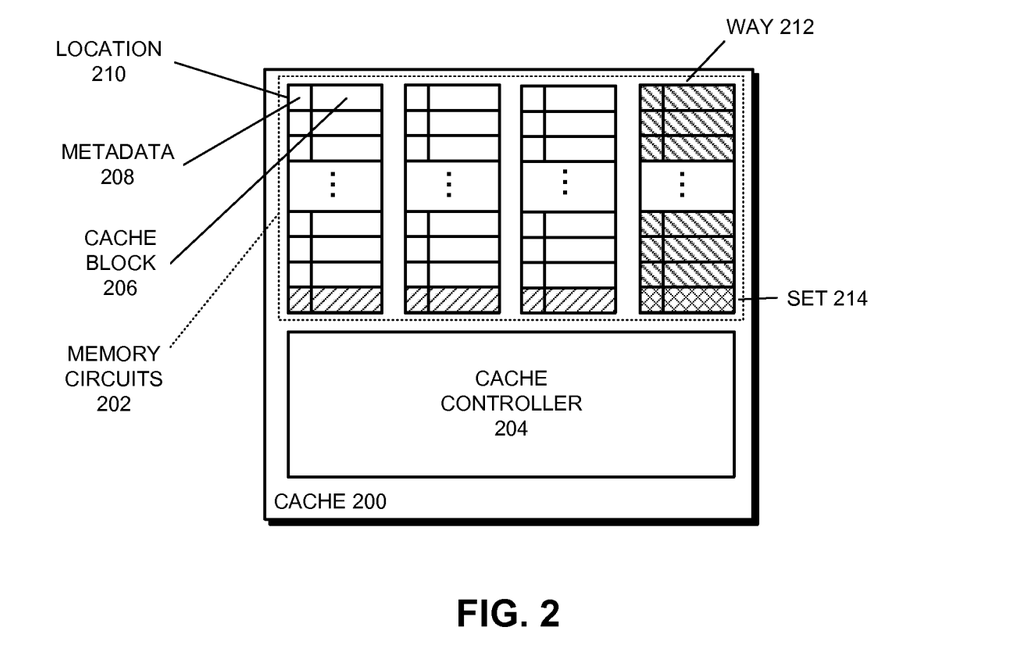
FIG. 2 presents a block diagram illustrating a cache in accordance with some embodiments.

FIG. 2 presents a block diagram illustrating a cache 200 in accordance with some embodiments. Cache 200 is a general example of an internal configuration that may be implemented in any of the caches in the described embodiments. For example, some or all of L1 caches 116-122, L2 cache 124, and L3 cache 104 can have, but are not required to have, internal configurations similar to cache 200. In this description, the "next lower level of the memory hierarchy" from cache 200 refers to a cache or memory below cache 200 in the hierarchy, which is dependent on which cache is represented by cache 200. For example, in embodiments where cache 200 is L3 cache 104, the next lower level of the memory hierarchy is main memory 106.

As can be seen in FIG. 2, cache 200 includes memory circuits 202 and cache controller 204. Cache controller 204 is a functional block that performs various functions for controlling operations in cache 200. For example, cache controller 204 can manage writing/storing cache blocks to, invalidating cache blocks in, and evicting cache blocks from cache 200; can perform lookups for cache blocks in cache 200; can handle coherency operations for cache 200; and/or can respond to requests for cache blocks from cache 200.

Memory circuits 202 (interchangeably called "memory" in cache 200) include one or more of SRAM, eDRAM, DRAM, DDR SDRAM, and/or other types of memory circuits that are divided into a set of locations, each location configured to store a cache block and metadata that includes information about the cache block (tags, indicators, flags, etc.). A cache block 206 and corresponding metadata 208 are labeled for example location 210 in cache 200. In some embodiments, each cache block comprises a cache line (although other embodiments can use different-sized cache blocks).

As described above, the memory in the caches in computing device 100 is limited (e.g., to 96 KB for L1 caches 116-122, 2048 KB for L2 cache 124, etc.), and so every cache block that may be loaded from main memory 106 cannot be simultaneously stored in a given cache. Instead, locations in the caches are shared, and therefore made available for storing cache blocks from various addresses in main memory 106. In the described embodiments, any of a number of operations/policies can be used for managing the storage of cache blocks in the limited memory in the caches. For example, some embodiments use "set associativity" for managing the storage of cache blocks. For set associativity, the memory in the cache is divided into a number of sets, and the sets are further divided into a number of ways. As can be seen in FIG. 2, cache 200 includes four ways, with an example way 212 indicated by left-leaning hash marks in the rightmost of the four ways in cache 200. In an example embodiment where the memory in cache 200 is 512 KB in size and 1 KB cache blocks are to be stored in cache 200, each way has storage for 128 cache blocks, and hence each way includes 128 sets (with ellipses representing sets not shown in FIG. 2). Each of the sets has a location in each way, with an example set 214 indicated by right-leaning hash marks in the bottommost location in each of the four ways in cache 200. Each set can be used to store cache blocks from a range of memory addresses, and hence the corresponding location in each way for the set can be used to store cache blocks from the range of memory addresses.

In embodiments that use set associativity, upon receiving a memory request to write (store) a cache block in cache 200 (e.g., from a processor core or a lower level in the memory hierarchy), cache controller 204 determines the set in which the received cache block is to be written. For example, in some embodiments, cache controller 204 compute the set using a hash function for which the input is some or all of an address for the cache block from the memory request. Cache controller 204 then determines if a location in the set can be used for storing the received cache block without replacing a cache block presently stored in that location (i.e., when there is an available/open location in the set). When a location in the set is available, cache controller 204 writes the cache block into the location.

However, when cache controller 204 determines that there is no location in the set that can be used without replacing a cache block presently stored in that location, cache controller 204 determines a cache block that is to be replaced from among the locations in the set. In other words, when each location in a given set is presently used for storing a cache block, in order to store a new cache block in the set, the cache block in one of the locations in the set should be evicted from cache 200 (e.g., written to a lower level of the memory hierarchy and/or overwritten) to make space for the cache block. When determining the cache block that is to be replaced, cache controller 204 can adhere to a replacement policy, which is generally an algorithm or set of rules used to determine the cache block that is to be evicted. In some embodiments, the replacement policy can be a first-in-first out policy, in which the first cache block to be stored in a set is evicted, a least-recently-used policy, in which the least recently accessed location in the set is evicted, and/or another replace-ment policy. After evicting the cache block from the determined location, cache controller 204 can store the received cache block in the location.

Although cache 200 is described using certain functional blocks and a particular number of ways, some embodiments include different numbers and/or types of functional blocks and/or ways. For example, cache 200 can include 8, 16, or another number of ways. Generally, the described embodiments can include any functional blocks and/or ways in cache 200 and/or computing device 100 that enable the operations herein described. Moreover, although some embodiments are described using set associativity, other embodiments use different types of associativity and/or different management policies for cache 200. For example, some embodiments use skewed associativity, full associativity, etc.

Figure 3:
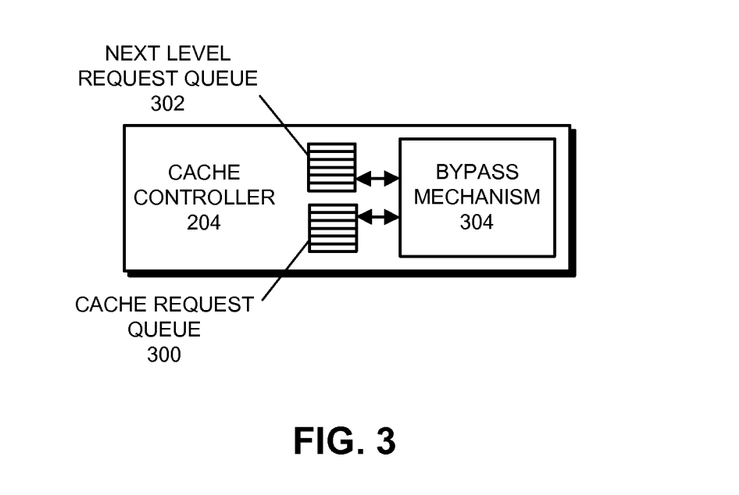
FIG. 3 presents a block diagram illustrating cache controller in accordance with some embodiments.

FIG. 3 presents a block diagram illustrating cache controller 204 in accordance with some embodiments. As can be seen in FIG. 3, cache controller 204 includes cache request queue 300. Cache request queue 300 is a memory structure with a number of entries (e.g., 16, 32, etc.) that are each configured to hold a memory request that is awaiting handling in cache 200. In these embodiments, when a memory request is to be attempted in cache 200, cache controller 204 places the memory request in the cache request queue 300. The memory request can then be retrieved from cache request queue 300 and handled in cache 200 at an appropriate time (e.g., in first-in-first-out order with respect to other memory requests in the queue, when cache controller 204 determines that the memory request should be handled in accordance with one or more predetermined conditions, etc.).

When memory requests are handled in cache 200, cache controller 204 determines if the data requested in the memory request is present in cache 200. If the data is present in cache 200 (e.g., is stored in a corresponding location in cache 200), cache 200 can retrieve the stored data and send the data to the source of the request (e.g., processor 102) in a response to the memory request. If not, cache controller 204 sends the memory request to the next level of the memory hierarchy (which can include placing the memory request in next level request queue 302).

Cache controller 204 also includes next level request queue 302. Next level request queue 302 is a memory structure with a number of entries (e.g., 16, 32, etc.) that are each configured to hold a memory request that is to be forwarded to a next level of the memory hierarchy (e.g., to a next lower cache or to main memory 106). In these embodiments, when a memory request is to be sent to a next level of the memory hierarchy for handling, cache controller 204 places the memory request in the next level request queue 302. The memory request can then be retrieved from next level request queue 302 and forwarded to the next level of the memory hierarchy at an appropriate time (e.g., in first-in-first-out order with respect to other memory requests in the queue, when cache controller 204 determines that the memory request should be handled in accordance with one or more predetermined conditions, etc.).

In some embodiments, memory requests held in cache request queue 300 and/or next level request queue 302 can be moved to the other of the queues. For example, a memory request held in cache request queue 300 can be moved to next level request queue 302. In these embodiments, when a memory request is moved from a first queue to a second queue, the memory request is handled according to how memory requests are handled for the second queue. For example, when a memory is moved from cache request queue 300 to next level request queue 302, the memory request is retrieved from next level request queue 302 and forwarded to the next level of the memory hierarchy at an appropriate time.

In some embodiments, memory requests are moved between the queues to as part of an operation for bypassing memory requests to a next lower level of the memory hierarchy. For example, assuming that a bypassable first memory request has been placed into cache request queue 300 so that the memory request is to be attempted in cache 200, bypass mechanism 304 can determine that a second memory request meets one or more conditions to be bypassed, but should not be bypassed because the second memory request meets one or more other conditions. For example, bypass mechanism 304 can determine that expected resolution times of the second memory request indicate that the second memory request should be bypassed, but the second memory request can be determined to be directed to a location in cache 200 that holds modified/dirty data, and therefore cannot be bypassed. Bypass mechanism 304 can therefore place the second memory request in cache request queue 300 and can move the first memory request from cache request queue 300 to next level request queue 302, thereby bypassing the first memory request instead of/in place of the second memory request.

Although embodiments are described using cache request queue 300 and next level request queue 302, some embodiments include more than one queue for cache 200 and/or the next level of the memory hierarchy. For example there could be one queue per cache bank (when cache 200 comprises a number of different banks (not shown) of memory circuits). As another example, cache 200 can include more than one queue for the next level of the memory hierarchy, such as one next level request queue per memory channel (in embodiments that include two or more channels of memory with separate memory circuits coupled to each channel) and/or a next level request queue for each of two or more banks (perhaps per channel) in the next lower level of the memory hierarchy. In addition, in some embodiments one or both of cache request queue 300 and next level request queue 302 may be located elsewhere in computing device 100, but is/are accessible to cache controller 204/bypass mechanism 304 for performing the functions herein described. For example, in some embodiments, a cache request queue 300 in a given cache (e.g., L3 cache 104) serves as the next level request queue 302 for the next higher level of cache (e.g., L2 cache 124), etc.

As can be seen in FIG. 3, cache controller 204 further includes bypass mechanism 304. Bypass mechanism 304 is a functional block that performs operations for bypassing memory requests to a next lower level of the memory hierarchy. In some embodiments, upon receiving a memory request, bypass mechanism 304 checks one or more conditions to determine if the memory request should be bypassed to a next lower level of the memory hierarchy or if an attempt should be made to satisfy given memory request in cache 200. For example, one condition that can be checked by bypass mechanism 304 is whether an expected memory request resolution time in the cache is greater (or within a predetermined value of) than an expected memory request resolution time in the next lower level of the memory hierarchy. Then, based on the one or more conditions, bypass mechanism 304 either bypasses the memory request to a next lower level of the memory hierarchy or attempts to satisfy the memory request in cache 200.

When bypassing memory requests, bypass mechanism 304 sends the memory request to the next lower level of the memory hierarchy without first attempting to satisfy the memory request in cache 200. For example, bypass mechanism 304 can place memory requests to be bypassed in the next level request queue 302, from where they are forwarded to the next level of the memory hierarchy as described above.

In contrast, when attempting to satisfy memory requests in cache 200, bypass mechanism 304 can place the memory requests in cache request queue 300, from where they are handled in cache 200 as described above.

In some embodiments, bypass mechanism 304 performs operations for bypassing memory requests in the presence of potentially modified/dirty data in cache 200. Specifically, bypass mechanism 304 performs operations for preventing a memory request from being bypassed to the next level of the memory hierarchy when the memory request is directed to a location in cache 200 that may contain modified data. As described below, bypass mechanism 304 can be configured in various ways to avoid bypassing memory requests that are directed to locations that may contain modified data.

In some embodiments, cache 200 performs operations for handling data returned in response to bypassed memory requests. In these embodiments, cache 200 selectively updates one or both of cache block 206 and metadata 208 for a corresponding location 210 in cache 200 based on data returned in response to bypassed memory requests.

Although embodiments are described using cache request queue 300, next level request queue 302, and bypass mechanism 304, in some embodiments, different mechanisms are used. As an example, in some embodiments, bypass mechanism 304 can be external to cache 200. In these embodiments, bypass mechanism 304 can be incorporated in an operating system in computing device 100, can be in processor 102, etc. Generally, in the described embodiments, computing device 100 can include any mechanisms that performs the operations herein described.

Conditions for Bypassing Memory Requests

As described above, in some embodiments, bypass mechanism 304 checks one or more conditions to determine if a given memory request should be bypassed to a next lower level of the memory hierarchy or if an attempt should be made to satisfy the memory request in cache 200. The conditions generally include any condition (or combination of two or more conditions) that can be used to determine if a memory request is likely to be more quickly and/or efficiently resolved in cache 200 or in the next lower level of the memory hierarchy. For example, bypass mechanism 304 can determine if an expected resolution time in cache 200 is longer/greater than an expected resolution time in the next lower level of the memory hierarchy. As another example, bypass mechanism 304 can determine if a source of a given memory request (e.g., a prefetcher in processor core 108, etc.) is a source from which memory requests are to be bypassed and/or if the memory request is directed to a predetermined type of memory (instructions, textures, etc.).

In some of the embodiments where bypass mechanism 304 determines if an expected resolution time in cache 200 is longer/more than an expected resolution time in the next lower level of the memory hierarchy, bypass mechanism 304 first determines an expected resolution time for the memory request in cache 200 ($C_{ERT}$) and an expected resolution time for the memory request in the next lower level of the memory hierarchy ($LL_{ERT}$). Bypass mechanism 304 then determines if $C_{ERT}$ has a predetermined relationship to $LL_{ERT}$ (e.g., is higher, is within a predetermined value of, etc.). If so, bypass mechanism 304 bypasses the memory request to the next level of the memory hierarchy. Otherwise, bypass mechanism 304 attempts to satisfy the memory request in cache 200. In this way, when an expected resolution time for satisfying a memory request in cache 200 becomes relatively long in comparison to the expected resolution time in the next lower level of the memory hierarchy, memory requests are bypassed to the next level of the memory hierarchy to provide better overall performance and throughput.

In some embodiments, the $C_{ERT}$ for a given memory request is equal to a number of memory requests in cache request queue 300 to be performed before the given memory request times an expected latency for memory requests in cache 200, and the $LL_{ERT}$ for the given request is equal to a number of memory requests in the next level request queue 302 to be performed before the given memory request times an expected latency for memory requests in the next lower level of the memory hierarchy. Generally, the expected latencies for memory requests in cache 200 and the next lower level of the memory hierarchy are amounts of time taken for memory requests to be resolved when sent to cache 200 or the next lower level of the memory hierarchy, respectively. The latencies can be average, a minimum, or a maximum amounts of time taken for memory requests to be resolved, and can be for any memory requests resolved in a last time period of N ms (where N=50, 100, 1000, etc.) or a last group of M resolved memory requests (where M=25, 100, etc.).

In some embodiments, computing the expected latency for cache 200 and/or the next level of the memory hierarchy comprises accounting for the expected performance of functional blocks/circuits in cache 200 and/or the next lower level of the memory hierarchy and adjusting the corresponding latencies accordingly. For example, when functional blocks/circuits in cache 200 and/or the next level of the memory hierarchy reach a maximum throughput, subsequent memory requests may face longer delays/latency in handling. As another example, in some embodiments, cache 200 and/or the next level of the memory hierarchy includes one or more pipelines for handling memory requests. In these embodiments, the expected latency is adjusted to account for pipeline capacity, performance, etc.

As described above, in some embodiments, bypass mechanism 304 is configured to bypass memory requests sent from certain sources, such as a prefetcher in processor 102 (memory requests from the prefetcher are interchangeably called "prefetch requests"). In some of these embodiments, memory requests from such sources may be bypassed to the next level of the memory hierarchy even when $LL_{ERT}$ is greater than $C_{ERT}$ (i.e., the prefetch requests may be bypassed even when it will likely take longer to resolve the prefetch requests in the next level of the memory hierarchy). In some embodiments, prefetch requests are sent to the next lower level of the memory hierarchy without checking $LL_{ERT}$ and/or $C_{ERT}$.

Bypassing Memory Requests in the Presence of Dirty Data

As described above, in some embodiments, computing device 100 (e.g., bypass mechanism 304, cache 200/the next lower level of the memory hierarchy, processor 102, and/or other functional blocks in computing device 100) performs operations for avoiding bypassing requests when the memory requests may access stale data in the next lower level of the memory hierarchy. Generally, stale data can be accessed in the next lower level of the memory hierarchy when cache 200 includes one or more cache blocks with data that was modified (e.g., by a processor core, a lower-level cache, etc.) and stored to a corresponding location in cache 200, but for which the cache blocks have not yet been written back to the next lower level of the memory hierarchy. One case where this can occur is when a "write-back" policy is used for cache 200, under which dirty/modified cache blocks can be stored in locations in cache 200 without immediately writing the same data to the next lower level of the memory hierarchy. In these embodiments, when a memory request is bypassed to the next lower level of the memory hierarchy, the data that is returned can be stale, in that the data is older than the modified data in the cache. Using the stale data in computational operations could lead to erroneous results for the computational operations.

In the described embodiments, computing device 100 can perform any of a number of operations for avoiding bypassed memory requests from accessing stale data in the next lower level of the memory hierarchy. The following examples describe operations that can be performed for avoiding bypassed memory requests accessing stale data in the next level of the memory hierarchy. Note that, although embodiments are described separately below, some embodiments use two or more of the example operations, including using two or more of the example operations simultaneously and/or dynamically switching between using one or more of the example operations as runtime conditions permit/require/dictate.

As a first example, some embodiments use a write-through policy for cache 200, under which dirty/modified cache blocks that are to be stored in cache 200 are immediately written (i.e., written as soon as possible and without avoidable delay) to the next lower level of the memory hierarchy. In this case, the next lower level of the memory hierarchy should not contain stale data.

As another example, in some embodiments, bypassing is constrained to memory requests that are unlikely to access stale data in the next lower level of the memory hierarchy because the cache blocks in cache 200 are unlikely to have been modified. For example, certain types of memory requests such as requests for instructions or textures that are rarely modified in cache 200. In these embodiments, such memory requests can be identified by the source of the memory request, such as memory requests (for instructions) received from an instruction unit, a memory request received from an L1 instruction cache, etc., or can be identified by the addresses in the memory requests (e.g., certain memory requests can be predetermined to be directed to rarely-modified cache blocks). In these embodiments, to avoid an error when a rare modification is made to relevant cache blocks in cache 200, cache controller 204 can be configured to perform an operation that removes modified cache blocks from cache 200 or otherwise updates the next lower level of the memory hierarchy. For example, cache controller 204 can invalidate the relevant cache blocks, can perform a cache flush, etc.

As yet another example, some embodiments allow cache 200 to contain modified data that is not immediately written to the next level of the memory hierarchy, and use an auxiliary structure for keeping a record of modified/dirty data in cache 200 to avoid accessing stale data in the next level of the memory hierarchy. For example, computing device 100 can include a table/list (not shown) that is read to determine locations in cache 200 that hold modified/dirty data. In these embodiments, the records can be kept for regions of cache 200 at any of a number of granularities/resolutions. For example, the record could be kept for regions that include one or more of individual cache blocks, pages (which is, e.g., a 4 KB, 8 KB, etc. block of addresses), and/or other regions of cache 200. In these embodiments, information from a given memory request (e.g., some or all of address information from the memory request) is compared to the record of modified/dirty data in cache 200 to determine if a location to be accessed by the given memory request in the next lower level of the memory hierarchy could contain stale data, and the memory request may not be allowed to be bypassed (regardless of other conditions met for the memory request) when the record indicates that the next lower level of the memory hierarchy could contain stale data. For example, when the record is kept at a granularity of pages, any memory request that accesses a page that with one or more dirty locations will not be allowed to bypass the cache to ensure correctness. As another example, some embodiments use the record to track the last N (where N=50, 100, etc.) unique cache accesses and record whether the accessed cache block was clean or dirty. In these embodiments, only when a given memory request is known to access a clean cache block will the memory request be allowed to bypass cache 200.

As a further example, some embodiments maintain an "inclusive" record of locations in cache 200 that contain modified data that can be used to determine when a memory request is directed to a location in cache 200 that contains dirty/modified data. For example, some embodiments maintain a directory in computing device 100 with this information. In these embodiments, the directory can be used as part of a directory-based cache coherence scheme—where the cache coherence scheme is generally a set of policies used to ensure that data in caches throughout computing device 100 can be maintained in a consistent state, despite numerous functional blocks having access to the data in the caches. In these embodiments, information from a given memory request (e.g., some or all of address information from the memory request) is used to look up a record for the corresponding location in the directory to determine if a location to be accessed by the given memory request in the next lower level of the memory hierarchy could contain stale data, and the memory request may not be allowed to be bypassed (regardless of other conditions met for the memory request) when the record indicates that the next lower level of the memory hierarchy could contain stale data.

In some embodiments, when a determination is made that a location in cache 200 (region/page/etc.) may contain modified data and so a memory request directed to the location is not to be bypassed, the memory request can be placed in cache request queue 300 so that the memory request will be handled in cache 200.

In some embodiments, at least some of the memory requests (e.g., prefetch requests) are allowed to be bypassed, and hence proceed to the next level of the memory hierarchy to be resolved, but a check is made to determine if a corresponding cache block in cache 200 holds modified data before any data returned in response to the memory request is stored in cache 200 or otherwise used in computing device 100. The returned data is discarded/ignored when the corresponding cache block contains modified data.

In some embodiments, requests are moved from next level request queue 302 to cache request queue 300 upon discovering that a received memory request is to access modified/dirty data in cache 200. For example, when placing a memory request directed to a location that holds modified/dirty data in cache 200 into cache request queue 300, a memory request that is already in cache request queue 300 that is not accessing dirty data could be moved over to the next level request queue 302 to maintain a determined balance between the queues.

Handling Data Returned for Bypassed Memory Requests

As described above, when data is returned from the next lower level of the memory hierarchy in response to a bypassed memory request, the data may (or may not) already be stored in the cache. This is true because the data may have been stored in cache 200 before the data was returned from the next lower level of the memory hierarchy in response to a bypassed memory request (and possibly before the memory request itself was bypassed). The described embodiments are configured for handling data returned in response to bypassed memory requests.

In the described embodiments, cache 200 can perform any of a number of operations for handling data returned in response to bypassed memory requests. The following examples describe some example operations for handling data returned in response to bypassed memory requests. Note that, although embodiments are described separately below, some embodiments use two or more of the example operations, including using two or more of the example operations simultaneously and/or dynamically switching between using one or more of the example operations as runtime conditions permit/require/dictate.

As a first example, some embodiments always store data returned from the next lower level of the memory hierarchy in response to a bypassed memory request in cache 200. These embodiments may overwrite the same data, if the data is already stored in cache 200.

As a second example, some embodiments never store data returned from the next lower level of the memory hierarchy in response to a bypassed memory request in cache 200. In these embodiments, the bypassed requests themselves can include an indication that the memory request was bypassed and/or computing device 100 can maintain a record of bypassed requests that can be checked to determine when data returned from the next lower level of the memory hierarchy has been returned in response to a bypassed memory request (and the returned data can be discarded/ignored). These embodiments may be useful when some predetermined portion of the data returned from the next lower level of the memory hierarchy is expected to already exist in cache 200 (which can be determined by, e.g., by profiling or monitoring past data returned from the next lower level of the memory hierarchy).

In some embodiments, the operation used for handling data returned in response to bypassed memory requests is dynamically determined. For example, in some embodiments, a business or activity level of cache 200 can be checked and data returned in response to a bypassed memory request is not stored in cache 200 when cache 200 is busy (e.g., has more than a predetermined amount of data awaiting writing in cache 200, etc.).

As part of handling data returned from the next lower level of the memory hierarchy, some embodiments also handle metadata for cache blocks to maintain relevant information when memory requests are bypassed. For example, some embodiments use a replacement policy such as a least frequently-used (LFU) and least recently-used (LRU) and bypassed memory requests can effect metadata for cache blocks used for replacement decisions. In some embodiments, when data is returned in response to a bypassed memory request, a check is performed to see whether a corresponding cache block is already stored in cache 200, and, if so, metadata for the cache block is appropriately updated.

Some embodiments also perform one or more operations for enforcing a memory model of computing device 100. For example, the memory model can be fully-ordered, in which results from memory requests are to be handled/processed in the order in which the memory requests where transmitted from a source in computing device 100. In these embodiments, computing device 100 can include reordering mechanisms, order-checking mechanisms, etc that enforce the memory model for computing device 100 with respect to both bypassed memory requests and memory requests sent to cache 200 for resolution.

Processes for Conditionally Bypassing Memory Requests

Figure 4:
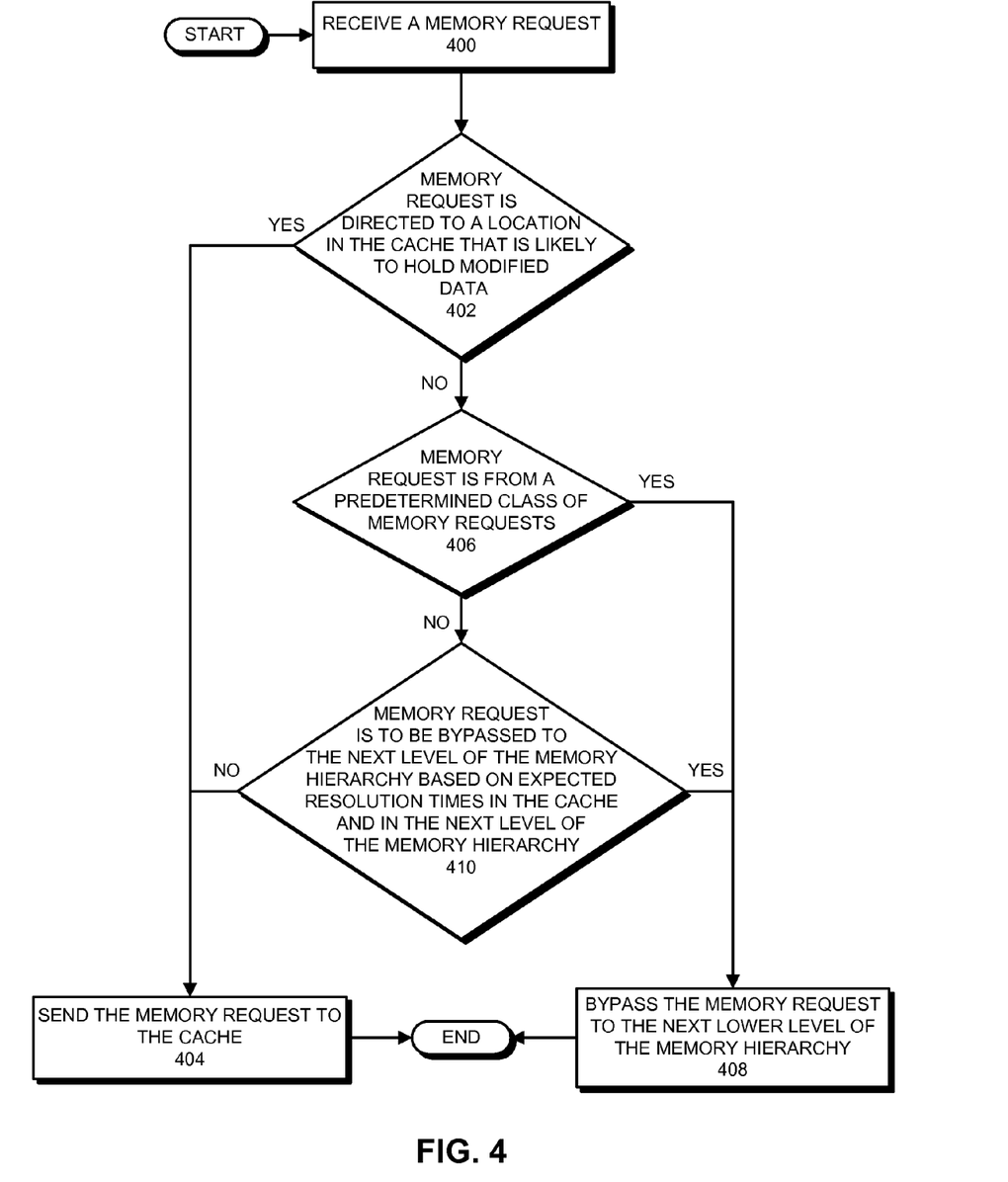
FIG. 4 presents a flowchart illustrating a process for bypassing memory requests in accordance with some embodiments.

FIG. 4 presents a flowchart illustrating a process for bypassing memory requests in accordance with some embodiments. Note that the operations shown in FIG. 4 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms can perform the operations.

In the following examples, cache 200 is used to describe example operations performed by some embodiments. Recall that cache 200 is a general example of the caches in the memory hierarchy. Thus, any of the L1 caches 116-122, L2 cache 124, and L3 cache 104 can be implemented with similar internal mechanisms to cache 200, and can therefore perform some or all of the example operations in the same way. Additionally, in this description, the "next lower level of the memory hierarchy" from cache 200 refers to a cache or memory below cache 200 in the hierarchy, which is dependent on which cache is represented by cache 200. For example, in embodiments where cache 200 is L3 cache 104, the next lower level of the memory hierarchy is main memory 106. As another example, in embodiments where cache 200 is L2 cache 124, the next lower level of the memory hierarchy is L3 cache 104.

The process shown in FIG. 4 starts when bypass mechanism 304 in cache 200 receives a memory request (step 400). For example, bypass mechanism 304 can receive the memory request from one of processor cores 108-114, a higher level cache, or another source. In the described embodiments, the memory request can be, or can include, any type of memory request that can be resolved in cache 200, such as memory reads, memory writes, etc.

Bypass mechanism 304 then determines if the memory request is directed to a location in cache 200 that is likely to hold modified/dirty data (step 402). For example, bypass mechanism 304 can check a list of dirty pages and can determine that the memory request is directed to a dirty page (and is therefore assumed to be directed to a location in cache 200 that holds modified data). If so, bypass mechanism 304 sends the memory request to cache 200 (step 404). In some embodiments, sending the memory request to cache 200 includes placing the memory request in a next available position in cache request queue 300, from which the memory request will subsequently be retrieved and processed in cache 200. Otherwise, if the memory request is directed to a location in cache 200 that is not likely to hold modified/dirty data, the process proceeds to step 406.

Bypass mechanism 304 next determines if the memory request is from a predetermined class of memory requests (step 406). For example, if the memory request is a request for an instruction or a texture (which are very rarely modified in cache 200). If so, bypass mechanism 304 bypasses the memory request to the next lower level of the memory hierarchy (step 408). In some embodiments, bypassing the memory request to the next level of the memory hierarchy includes placing the memory request in a next available position in next level request queue 302, from which the memory request will subsequently be retrieved and sent to the next level of the memory hierarchy for processing. Otherwise, if the memory request is not from a predetermined class of memory requests, the process proceeds to step 410.

Bypass mechanism 304 then determines if the memory request is to be sent to the cache or is to be bypassed to the next lower level of the memory hierarchy based on expected memory request resolution times (step 410). For example, bypass mechanism 304 can compute a first expected resolution time based on a first expected latency of memory requests to the cache and a first number of memory requests to be sent to the cache and a second expected resolution time based on a second expected latency of memory requests to the next lower level of the memory hierarchy and a second number of memory requests to be sent to the next lower level of the memory hierarchy. In some embodiments, the first number of memory requests to be sent to the cache includes each other memory request before the memory request in cache request queue 300 and the second number of memory requests to be sent to the next lower level of the memory hierarchy includes each other memory request before the memory request in next level request queue 302. Bypass mechanism 304 then determines that the memory request is to be sent to the cache (step 404) when the first expected resolution time is lower then the second expected resolution time and determines that the memory request is to be bypassed to the next lower level of the memory hierarchy (step 408) when the second expected resolution time is lower then the first expected resolution time.

Figure 5:
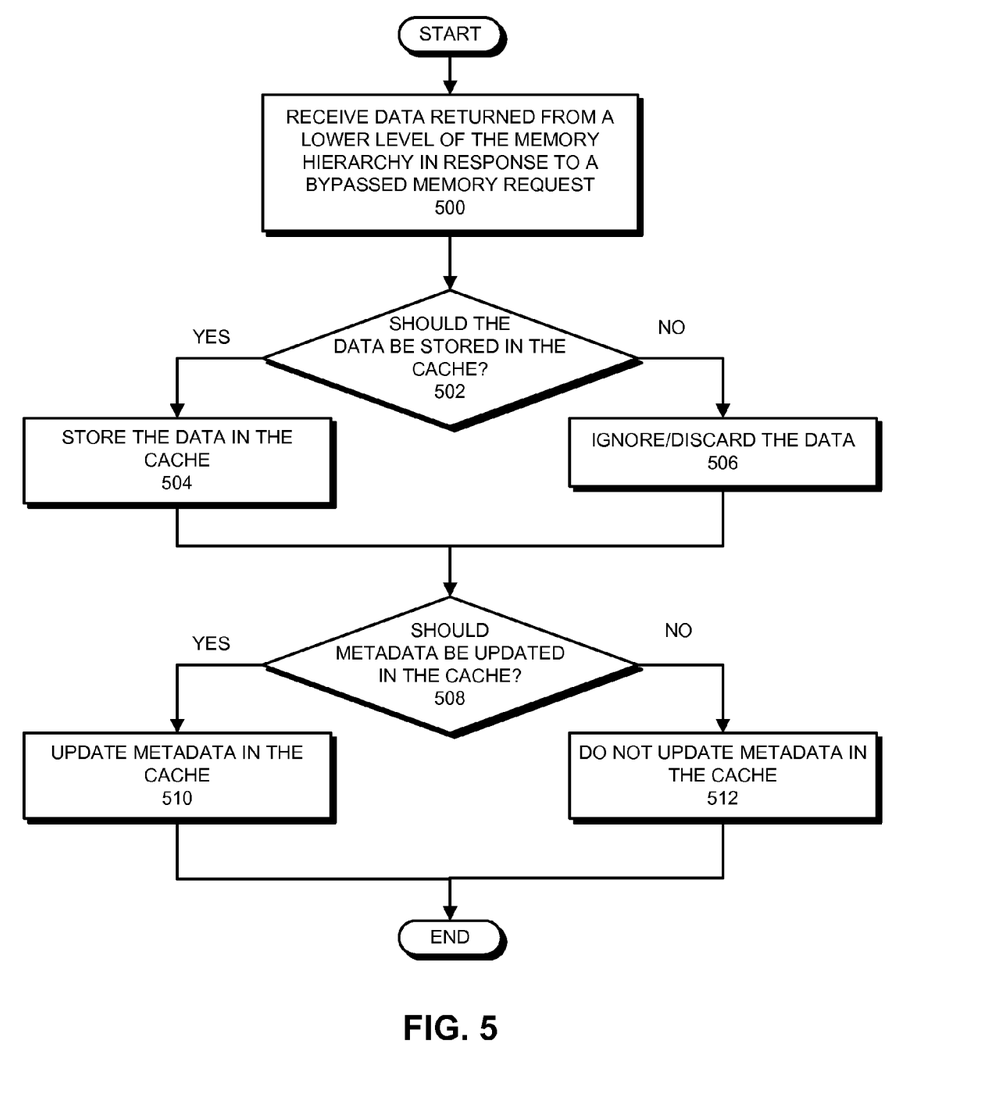
FIG. 5 presents a flowchart illustrating a process for handling data returned in response to a bypassed memory request in accordance with some embodiments.

FIG. 5 presents a flowchart illustrating a process for handling data returned in response to a bypassed memory request in accordance with some embodiments. Note that the operations shown in FIG. 5 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms can perform the operations.

The process shown in FIG. 5 starts when cache 200 receives data returned from the next lower level of the memory hierarchy in response to a bypassed memory request (step 500). For example, and depending on the type of memory request and the nature of cache 200/processor 102, cache 200 can receive instructions, data, textures, colors, depths, etc. In some embodiments, receiving the data includes performing one or more checks (e.g., in a list of bypassed requests, in a flag in the response, etc.) to determine whether the data is being returned in response to a bypassed request.

Cache 200 then determines based on a predetermined policy whether to store the data in a corresponding location in cache 200 (step 502). For example, the policy can dictate that the returned data for bypassed requests is never to be stored in cache 200, is always to be stored in cache 200, or is conditionally to be stored in cache 200 (based, e.g., on whether cache 200 is busy, etc.). When the data is to be stored in cache 200, cache 200 stores the data in cache 200 (step 504). Specifically, cache 200 determines a location for the data in cache 200 (which can involve using a replacement policy to determine existing data in cache 200 to be replaced, etc.) and stores the data in the determined location. Otherwise, cache 200 discards/ignores the data (step 506).

Cache 200 next determines if metadata for one or more locations in cache 200 is to be updated based on the returned data (step 508). For example, when a least-recently-used policy is used for cache 200, cache 200 can determine if least recently used information for a corresponding set in cache 200 is to be updated based on the returned data (and the underlying bypassed memory request). If so, cache 200 updates the metadata for one or more locations in cache 200 (step 510). Otherwise, cache 200 does not update metadata in cache 200 (step 512).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling memory requests, comprising:
   in a bypass mechanism, performing operations for:
   when a memory request is to be sent to a cache or to be bypassed to a next lower level of a memory hierarchy based on expected memory request resolution times, sending the memory request to the cache or bypassing the memory request to the next lower level of the memory hierarchy.

2. The method of claim 1, wherein the method further comprises:
   determining that the memory request is to be sent to the cache or is to be bypassed to the next lower level of the memory hierarchy based on expected memory request resolution times by:
   computing a first expected resolution time based on a first expected latency of memory requests to the cache and a first number of memory requests to be sent to the cache;
   computing a second expected resolution time based on a second expected latency of memory requests to the next lower level of the memory hierarchy and a second number of memory requests to be sent to the next lower level of the memory hierarchy;
   determining that the memory request is to be sent to the cache when the first expected resolution time is lower then the second expected resolution time; and
   determining that the memory request is to be bypassed to the next lower level of the memory hierarchy when the second expected resolution time is lower then the first expected resolution time.

3. The method of claim 2, wherein the first expected latency of memory requests to the cache and the second expected latency of memory requests to the next lower level of the memory hierarchy are one of:
   average latencies, or
   minimum latencies.

4. The method of claim 2, wherein the method further comprises:
   adjusting one or more of the first expected latency and the second expected latency based on at least one configuration of circuits.

5. The method of claim 2, wherein the method further comprises:
   determining that the memory request is to be bypassed to the next lower level of the memory hierarchy when the memory request is from a predetermined class of memory requests.

6. The method of claim 2, wherein the method further comprises:
   maintaining one or more records of dirty data in the cache;
   prior to determining if the memory request is to be sent to the cache or to be bypassed to the next lower level of the memory hierarchy, determining, based on the one or more records, that the memory request is likely directed to dirty data in the cache; and
   sending the memory request that is likely directed to dirty data to the cache.

7. The method of claim 6, wherein sending the memory request that is likely directed to dirty data to the cache comprises placing the memory request in a queue of memory requests to be sent to the cache, and wherein the method further comprises:
   before placing the memory request in the queue, determining at least one memory request that was previously placed in the queue to be removed from the queue and bypassed to the next lower level of the memory hierarchy.

8. The method of claim 6, wherein the memory request is to access a cache block, wherein maintaining the one or more records of dirty data in the cache comprises maintaining at least one record for a region of the cache that includes a plurality of cache blocks, wherein the at least one record indicates that all cache blocks in the region may contain dirty data when any one of the cache blocks in the region contains dirty data.

9. The method of claim 6, wherein maintaining one or more records of dirty data in the cache comprises maintaining a directory with a listing of dirty data in the cache.

10. The method of claim 1, wherein, after bypassing the memory request to the next lower level of the memory hierarchy, the method further comprises:
    receiving data in response to the memory request from the next lower level of the memory hierarchy;
    determining, based on a predetermined policy, that the data received in response to the bypassed memory request should be stored in the cache; and
    storing the data in the cache.

11. The method of claim 1, wherein, after bypassing the memory request to the next lower level of the memory hierarchy, the method further comprises:
    receiving data in response to the memory request from the next lower level of the memory hierarchy; and
    updating metadata in the cache to indicate that a corresponding location in the cache was accessed.

12. The method of claim 1, wherein bypassing the memory request to the next lower level of the memory hierarchy comprises sending the memory request to the next lower level of the memory hierarchy without first attempting the memory request in the cache.

13. The method of claim 1, wherein the method further comprises:
    copying at least a portion of data written to the cache to the next lower level of the memory hierarchy to ensure that the memory request bypassed to the next lower level of the memory hierarchy results in a same data being returned as would have been returned if the memory request was sent to the cache.

14. An apparatus that handles memory requests, comprising:
    a memory hierarchy comprising a cache and at least one level lower than the cache; and
    a bypass mechanism;
    wherein when a memory request is to be sent to the cache or to be bypassed to a next lower level of the memory hierarchy based on expected memory request resolution times, the bypass mechanism is configured to send the memory request to the cache or bypass the memory request to the next lower level of the memory hierarchy.

15. The apparatus of claim 14, wherein, when determining that the memory request is to be sent to the cache or is to be bypassed to the next lower level of the memory hierarchy based on expected memory request resolution time, the bypass mechanism is configured to:
    compute a first expected resolution time based on a first expected latency of memory requests to the cache and a first number of memory requests to be sent to the cache;
    compute a second expected resolution time based on a second expected latency of memory requests to the next lower level of the memory hierarchy and a second number of memory requests to be sent to the next lower level of the memory hierarchy;

determine that the memory request is to be sent to the cache when the first expected resolution time is lower then the second expected resolution time; and determine that the memory request is to be bypassed to the next lower level of the memory hierarchy when the second expected resolution time is lower then the first expected resolution time.

16. The apparatus of claim 15, wherein the bypass mechanism is further configured to:

bypass the memory request to the next lower level of the memory hierarchy when the memory request is from a predetermined class of memory requests.

17. The apparatus of claim 15, wherein the bypass mechanism is further configured to:

maintain one or more records of dirty data in the cache;

wherein, prior to determining if the memory request is to be sent to the cache or to be bypassed to the next lower level of the memory hierarchy, the bypass mechanism is further configured to:

determine, based on the one or more records, that the memory request is likely directed to dirty data in the cache; and send the memory request that is likely directed to dirty data to the cache.

18. The apparatus of claim 14, wherein, after bypassing the memory request to the next lower level of the memory hierarchy, the cache is configured to:

receive data in response to the bypassed memory request from the next lower level of the memory hierarchy;

determine, based on a predetermined policy, that the data received in response to the bypassed memory request should be stored in the cache; and store the data in the cache.

19. The apparatus of claim 14, wherein, after bypassing the memory request to the next lower level of the memory hierarchy, the cache is configured to:

receive data in response to the bypassed memory request from the next lower level of the memory hierarchy; and update a metadata in the cache to indicate that a corresponding location in the cache was accessed.

20. A computer-readable storage medium storing instructions that, when executed by a computing device, cause the computing device to perform method for handling memory requests, the method comprising:

when a memory request is to be sent to a cache or to be bypassed to a next lower level of a memory hierarchy based on expected memory request resolution times, sending the memory request to the cache or bypassing the memory request to the next lower level of the memory hierarchy.

* * * * *